United States Patent [19]

Derby et al.

[11] Patent Number: 5,365,523
[45] Date of Patent: Nov. 15, 1994

[54] FORMING AND MAINTAINING ACCESS GROUPS AT THE LAN/WAN INTERFACE

[75] Inventors: Jeffrey H. Derby, Chapel Hill, N.C.; Willibald A. Doeringer, Langnau, Switzerland; John E. Drake, Jr., Pittsboro, N.C.; Douglas H. Dykeman, Rueschlikon, Switzerland; Liang Li, Chapel Hill; Marcia L. Peters, Pittsboro, both of N.C.; Haldon J. Sandick, Durham; Ken Van Vu, Cary, both of N.C.

[73] Assignee: International Business Machines Corporation, Armonk, N.Y.

[21] Appl. No.: 976,826

[22] Filed: Nov. 16, 1992

[51] Int. Cl.[5] .................... H04L 12/46; H04L 12/66
[52] U.S. Cl. ............................ 370/85.2; 370/85.13
[58] Field of Search ................. 370/85.2, 85.12, 85.13, 370/852, 85.1, 94.3, 94.1, 16, 13, 60

[56] References Cited

U.S. PATENT DOCUMENTS

| | | | |
|---|---|---|---|
| 5,018,133 | 5/1991 | Tsukakoshi et al. | 370/16 |
| 5,079,765 | 1/1992 | Nakamura | 370/85.13 |
| 5,079,767 | 1/1992 | Perlman | 370/94.3 |
| 5,138,615 | 8/1992 | Lamport et al. | 370/94.1 |
| 5,172,372 | 12/1992 | Konishi | 370/85.13 |

FOREIGN PATENT DOCUMENTS

| | | | |
|---|---|---|---|
| 2341191 | 1/1987 | European Pat. Off. | H04L 11/20 |
| 511142 | 3/1992 | European Pat. Off. | H04L 12/66 |

OTHER PUBLICATIONS

Article, LAN Interconnect Using X.25 Network Services, John J. Barrett pp. 12–16 IEEE Network, Sep. 5, 91, No. 5, New York, H04L 12/66.

IEEE Transactions on Communications, vol. com-28, No. 4, Apr. 1980, "Routing Techniques Used in Computer Communication Networks" by Schwartz pp. 539–552.

*Primary Examiner*—Douglas W. Olms
*Assistant Examiner*—Huy D. Vu
*Attorney, Agent, or Firm*—Gerald R. Woods

[57] ABSTRACT

Access agents in nodes at the LAN/WAN interface are formed into a group of access agents so that the access agents may be managed by the WAN as a group. The group must maintain group operation integrity in that if communications between agents in the group are broken, the access agents will coalesce into subgroups and continue performing communication jobs as a group activity. Each of the access agents contains a finite state machine to perform the tasks of group formation and maintenance. The formation of interconnected access agents into a group is accomplished by one access agent being identified as a group leader. All other access agents communicating with the group leader within the LAN may then join the group. The maintenance of group activity integrity is accomplished by detecting a break in group communication integrity and thereafter reforming the group into multiple smaller groups. The maintenance of group operation integrity also includes the merger of small groups into a large group when a bridge is added between LAN segments.

23 Claims, 22 Drawing Sheets

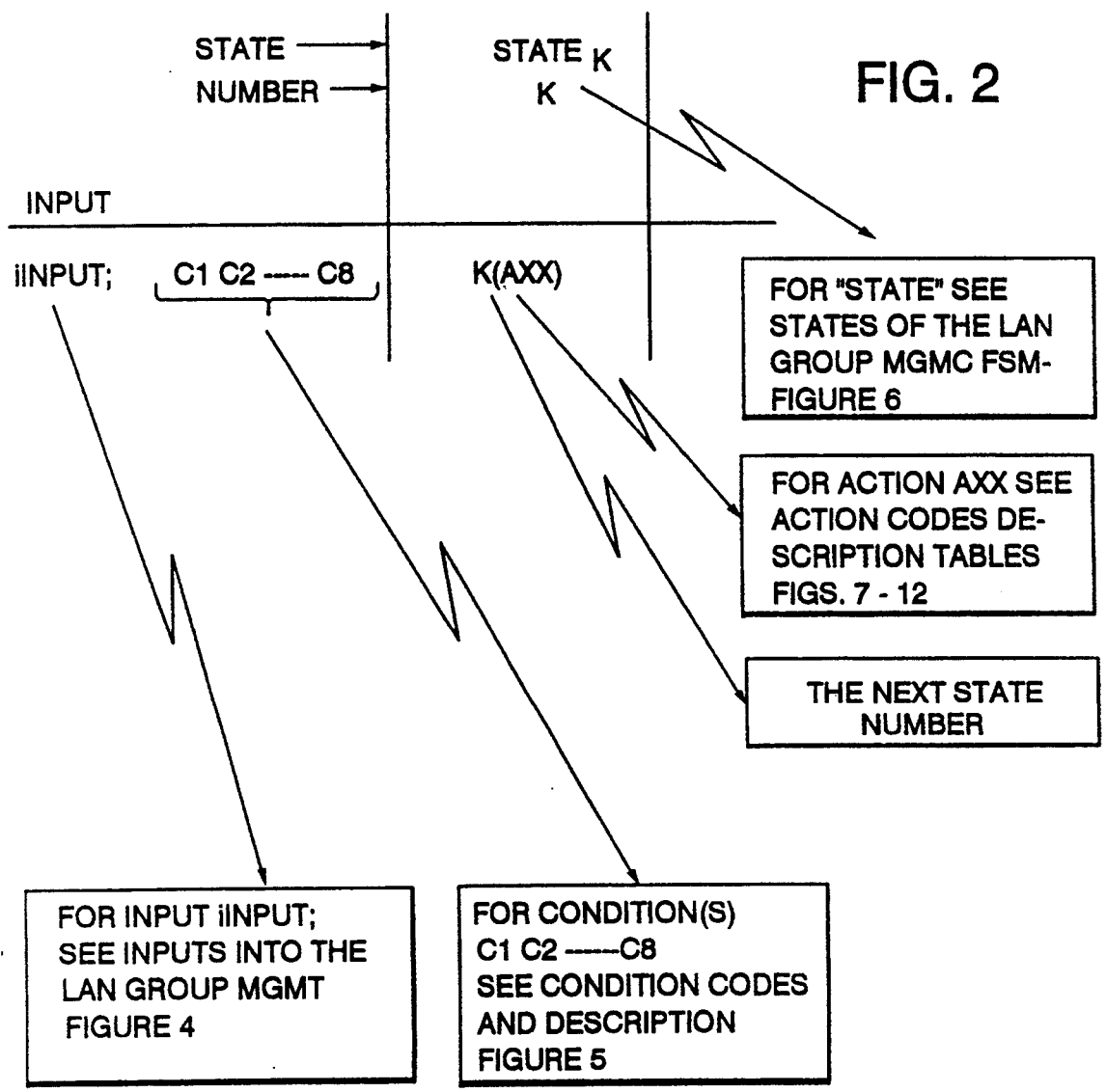

FIG. 3

FSM_GROUP_MGMT. TABLE

| INPUT \ STATE (NUMBER) | RESET 0 | NEGO-TIATE 1 | PEND-ING 2 | MERGE 3 | ASSIGN-ED 4 | MAA 5 |
|---|---|---|---|---|---|---|
| iRESET | (A00) | 0(A00) | 0(A00) | 0(A00) | 0(A00) | 0(A00) |
| iHBTimer | -(-) | -(A10) | -(-) | 4(A11) | -(-) | -(A12) |
| iKATimer, vROUNDS < cMinRounds | 1(A20) | -(A21) | 1(A22) | 1(A22) | 1(A22) | 1(A22) |
| iKATimer, vROUNDS >= cMinRounds | / | 5(A23) | 1(A22) | 1(A22) | 1(A22) | 1(A22) |
| iHNeg. C1,C2,C5 | / | -(A31) | -(-) | -(-) | -(-) | -(A35) |
| iHNeg. C1,C2, NOT C5 | / | 2(A32) | -(-) | -(-) | -(-) | -(A35) |
| iHNeg. C1,NOT C2,C8 | 2(A30) | 2(A32) | -(-) | -(-) | -(-) | -(A35) |
| iHNeg. NOT C1,C2 | / | -(A31) | -(-) | -(-) | -(-) | -(A35) |
| iHNeg. NOT (C1 OR C2),C3,C4,C5,C8 | / | -(A34) | -(-) | -(-) | -(-) | -(A35) |
| iHNeg. NOT (C1 OR C2),C3,C4,NOT C5,C8 | / | 2(A32) | -(-) | -(-) | -(-) | -(A35) |
| iHNeg. NOT (C1 OR C2),C3,NOT C4,C8 | 1(A33) | -(A34) | -(-) | -(-) | -(-) | -(A35) |
| iHNeg. NOT (C1 OR C2),NOT C3,C4,C8 | / | 2(A32) | -(-) | -(-) | -(-) | -(A35) |
| iHNeg. NOT (C1 OR C2),NOT (C3 OR C4),C5,C8 | 1(A33) | -(A31) | -(-) | -(-) | -(-) | -(A35) |
| iHNeg. NOT (C1 OR C2),NOT (C3 OR C4), NOT C5,C8 | 2(A30) | 2(A32) | -(-) | -(-) | -(-) | -(A35) |
| iHMerge. C6,C8 | -(-) | -(-) | -(-) | -(A40) | 3(A41) | 4(A42) |
| iHMerge. C7, C8 | / | -(-) | -(-) | 4(A43) | -(A43) | / |
| iHMerge. NOT(C6 OR C7), C8 | / | -(-) | -(-) | -(A52) | -(-) | (A44) |
| iHMAA, C6, C8 | 4(A50) | 4(A51) | 4(A51) | -(-) | 3(A53) | 4(A54) |
| iHMAA, C7, C8 | 4(A50) | 4(A51) | 4(A51) | -(-) | -(A55) | -(A55) |
| iHMAA, NOT(C6 OR C7), C8 | | 4(A51) | 4(A51) | -(-) | -(-) | -(A56) |

FIG. 4

| INPUTS INTO THE LAN GROUP MANAGEMENT FSM. ||
|---|---|
| INPUT | DESCRIPTION |
| iReset | RESET SIGNAL. THIS SIGNAL IS MOST LIKELY RECEIVED AS PART OF A GRACEFUL SHUTDOWN OF LAN ACCESS AGENT OPERATIONS. |
| iHBTimer | THE TIMER DEFINING THE HEARTBEAT PERIOD EXPIRED. IT IS ASSUMED THAT THE KEEP-ALIVE TIMER BELOW DEFINES A PERIOD OF CONSIDERABLY LARGER LENGTH. |
| iKATimer | THE KEEP-ALIVE TIMER EXPIRED. THIS TIMER IS MAINTAINED BY EACH ACCESS AGENT OF A MAG TO RUN HEALTH CHECKS ON THE CURRENT MAA. THE PERIOD DEFINED BY THIS TIMER SHOULD BE CONSIDERABLY LONGER THAN THAT DEFINED BY THE HEARTBEAT TIMER ABOVE. A TYPICAL CHOICE MIGHT BE KATimer - N* HBTimer, N> > 1 |
| iHNeg | HELLO MESSAGE OF TYPE NEGOTIATE |
| iHMerge | HELLO MESSAGE OF TYPE MERGE |
| iHMAA | HELLO MESSAGE OF TYPE MAA |

FIG. 5

CONDITION CODES AND DESCRIPTIONS.

| CODE | DESCRIPTION | COMMENTS |
|---|---|---|
| C1 | NODEID(HELLO.MAA_ADDRESS) == NODEID(HELLO.TU_ADDRESS) | MESSAGE OF A TU RESIDING IN THE SAME NODE AS PREVIOUS MAA |
| C2 | NODEID(vMAA_ADDRESS) == NODEID(vTU_ADDRESS) | LOCAL TU RESIDES IN THE SAME NODE AS CURRENT MAA |
| C3 | NODEID(HELLO.MAA_ADDRESS) == NODEID(vTU_ADDRESS) | ACCESS AGENT RESIDES IN THE SAME NODE AS OTHER MAA |
| C4 | NODEID(HELLO.TU_ADDRESS) == NODEID(vMAA_ADDRESS) | |
| C5 | HELLO.TU_ADDRESS > vTU_ADDRESS | THE OTHER TU LOSES (SEE NOTE 2) |
| C6 | vMAA_ADDRESS > HELLO.MAA_ADDRESS | THE OTHER MAA WINS (SEE NOTE 2) |
| C7 | vMAA_ADDRESS == HELLO.MAA_ADDRESS | MESSAGE IS FROM OWN MAA |
| C8 | vWANid == HELLO.WANid | THIS HELLO MESSAGE IS PRESENTED BY AN ACCESS AGENT IN THE SAME WAN. |

FIG. 6A

| | STATES OF THE LAN GROUP MANAGEMENT FSM |
|---|---|
| STATE | DESCRIPTION |
| RESET | INITIAL STATE THIS STATE IS ONLY REENTERED AFTER AN EXPLICIT RESET SIGNAL TO THE FSM |
| NEGOTIATE | IN THIS STATE A LAN ACCESS AGENT PARTICIPATES IN THE MAA NEGOTIATION |
| PENDING | THE LOCAL ACCESS AGENT HAS RECEIVED A HELLO MESSAGE OF TYPE NEGOTIATE FROM A PARTNER ACCESS AGENT WHICH IS BETTER SUITED TO SELECTED AS THE NEW MAA. THE LOCAL ACCESS AGENT THEREFORE REFRAINS FROM FURTHER ATTEMPTS TO BECOME MAA ITSELF. |
| MERGE | THIS STATE IS ENTERED WHEN A NON-MONITOR AA DETECTS THAT MULTIPLE MAAS ARE PRESENT ON THE LOCAL LAN. |
| ASSIGNED | WHEN NO DYNAMIC ADAPTATIONS OF THE MAG ARE BEING PERFORMED. ALL NON-MONITOR ACCESS AGENTS OF A MAG ARE IN THIS STATE. IN PARTICULAR THERE EXISTS A SINGLE MAA WHICH IS TRANSMITTING PERIODIC HEARTBEAT HELLO MESSAGES. |
| MAA | THIS STATE IS RESERVED FOR THE SELECTED MONITOR AA |

FIG. 6B

WAN GROUP MANAGEMENT SERVICES.

| OPER-ATION | PURPOSE | INPUT | OUTPUT | COMMENTS |
|---|---|---|---|---|
| JOIN | THE ISSUING TRANSPORT USER WANTS TO JOIN THE INDICATED GROUP. | GROUPID REQUESTOR'S TU ADDRESS | +/- REPLY | AS ONE OF POSSIBLY SEVERAL RESULTING ACTIONS, WAN GROUP MANAGEMENT ADDS THE NEW TU'S ADDRESS TO THE LIST OF MEMBERS OF THE GROUP. |
| LEAVE | THE ISSUING USERS WANTS TO LEAVE THE SPECIFIED GROUP. | GROUPID REQUESTOR'S TU ADDRESS | +/- REPLY | AS ONE OF POSSIBLY SEVERAL RESULTING ACTIONS, WAN GROUP MANAGEMENT DELETES THE INVOKING TU'S ADDRESS FROM THE LIST OF MEMBERS OF THE GROUP. |
| MERGE | MERGE AN ALREADY EXISTING GROUP INTO THE SPECIFIED GROUP. | DESTINATION GROUPID SOURCE GROUPID | +/- REPLY | AS ONE OF POSSIBLY SEVERAL RESULTING ACTIONS, WAN GROUP MANAGEMENT ADDS ALL TUS OF THE SOURCE GROUP TO THE MEMBER LIST OF THE DESTINATION GROUP AND MARKS THE SOURCE GROUPID AS UNUSED. |
| QUERY SET MEMBERS | OBTAIN GROUP STATUS INFORMATION ABOUT THE SPECIFIED GROUP | GROUPID | +/- REPLY LIST OF TU ADDRESSES OF ALL GROUP MEMBERS. | |

FIG. 6C

DESCRIPTION OF LOCAL VARIABLES FOR THE MAG FSM. THE INITIAL VALUES ARE ASSIGNED AS PART OF LAN ACCESS AGENT'S INITIALIZATION PROCEDURE.

| VARIABLES | DESCRIPTION | INITIAL VALUES |
|---|---|---|
| vTU_address | TU ADDRESS OF LOCAL ACCESS AGENT | ADDRESS AS SPECIFIED IN THE LOCAL CONFIGURATION INFORMATION |
| vRounds | IN THE NEGOTIATE STATE THIS VARIABLE KEEPS TRACK OF THE NUMBER OF CONSECUTIVE KEEP-ALIVE PERIODS EXPERIENCED IN THIS STATE. IF THE NUMBER REACHES A PREDEFINED THRESHOLD THE LOCAL ACCESS AGENT ASSUMES TO HAVE BEEN SELECTED AS MAA | ZERO |
| vGroupid | GROUP IDENTIFIER OF THE MAG THIS ACCESS AGENT MIGHT BE MEMBER OF (SEE vMEMBER) | IDENTIFIER AS SPECIFIED IN THE LOCAL CONFIGURATION INFORMATION |
| vMember | BOOLEAN VARIABLE. INDICATES WHETHER THE ACCESS AGENT IS MEMBER OF THE MAG WHOSE GROUPID IS STORED IN vGroupid | FALSE |
| vMAA_address | ADDRESS OF CURRENT MAA OF MAG DENOTED BY vGroupid | NULL |
| vMembership_List | MEMBERSHIP LIST OF LOCAL MAG | NULL |

NOTE: VARIABLES WHICH ARE ONLY KEPT FOR SOME TRANSIENT PERIOD ARE IDENTIFIED AS SUCH BY THE PREFIX TMP IN THE FOLLOWING FSM DESCRIPTION AND NOT EXPLICITLY MENTIONED HERE. WHENEVER A HELLO MESSAGE IS TRANSMITTED, THE PERTINENT FIELDS OF THE MESSAGE ARE SET TO THE VALUE OF THE RESPECTIVE LOCAL VARIABLE.

FIG. 7

ACTION CODES AND DESCRIPTIONS FOR INPUT iReset.

| CODE | DESCRIPTION | COMMENTS |
|---|---|---|
| A00 | 1. IF (vMember == TRUE)<br>    LEAVE (vGroupid)<br>2. RESET ALL VARIABLES<br>3. START KATimer | TYPICAL RESET OPERATIONS |

FIG. 8

ACTION CODES AND DESCRIPTIONS FOR INPUT iHBTimer.

| CODE | DESCRIPTION | COMMENTS |
|---|---|---|
| A10 | 1. START HBTimer<br>2. TRANSMIT (HELLO(NEGOTIATE)) | CONTINUE THE NEGOTIATION |
| A11 | 1. LEAVE (vGroupid)<br>2. vMember: = FALSE<br>3. SAVE Tmp.HELLO FIELDS IN LOCAL VARIABLES<br>4. JOIN (vGroupid)<br>5. vMember: = TRUE | THE NEW MAA IS NOW ACCEPTED SINCE THE ACCESS AGENT HAS NOT RECEIVED A HELLO(MERGE) FROM ITS PREVIOUS MAA |
| A12 | 1. START HBTimer<br>2. IF MEMBERSHIP IN MAG CHANGED<br>    UPDATE vMembership_List<br>    TRANSMIT (HELLO(MAA, vMembership_List)<br>3. ELSE<br>    TRANSMIT (HELLO(MAA)) | |

FIG. 9

ACTION CODES AND DESCRIPTIONS FOR INPUT iKATimer.

| CODE | DESCRIPTION | COMMENTS |
|---|---|---|
| A20 | 1. RESET ALL LOCAL VARIABLES TO THEIR INITIAL VALUES<br>2. START HBTimer AND KATimer<br>3. TRANSMIT (HELLO(NEGOTIATE)) | ENTER NEGOTIATION PHASE SINCE NO HEARTBEAT MESSAGE HAS BEEN RECEIVED |
| A21 | 1. INCREMENT vRounds<br>2. START KATimer | |
| A22 | 1. RESET vRounds<br>2. START HBTimer AND KATimer<br>3. TRANSMIT (HELLO(NEGOTIATE)) | LEAVE OPERATIONS ARE DELAYED AS LONG AS POSSIBLE SINCE THE OLD GROUP MIGHT STILL EXIST |
| A23 | 1. vMAA_address: = vTU_address<br>2. IF vMember == FALSE<br>   ACQUIRE A NEW GROUPID BASED ON THE LOCAL NODEID AND SAVE IT IN vGroupid<br>   JOIN (vGroupid)<br>3. vMember: = TRUE<br>4. START HBTimer and KATimer<br>5. vMembership_List: = CURRENT LIST OF GROUP MEMBERS<br>6. TRANSMIT (HELLO(MAA, vMembership_List)) | THE LOCAL ACCESS AGENT ASSUMES THE ROLE OF MAA |

NOTE: TU ADDRESS IS THE AA ADDRESS VIEWED FROM WAN.

FIG. 10

ACTION CODES AND DESCRIPTIONS FOR INPUT iHNeg.

| CODE | DESCRIPTION | COMMENTS |
|---|---|---|
| A30 | 1. START KATimer | |
| A31 | 1. TRANSMIT (HELLO(NEGOTIATE)) | |
| A32 | 1. STOP HBTimer<br>2. START KATimer | |
| A33 | 1. RESET ALL LOCAL VARIABLES TO THEIR INITIAL VALUES<br>2. SAVE HELLO FIELDS IN LOCAL VARIABLES<br>3. START HBTimer AND KATimer<br>4. TRANSMIT (HELLO(NEGOTIATE)) | SAVE NEW "BETTER" INFORMATION |
| A34 | 1. RESET ALL LOCAL VARIABLES TO THEIR INITIAL VALUES<br>2. SAVE HELLO FIELDS IN LOCAL VARIABLES<br>3. TRANSMIT (HELLO(NEGOTIATE)) | SWITCH MAA TO GET A BETTER CHANCE FOR SUCCESSFUL NEGOTIATION |
| A35 | 1. TRANSMIT (HELLO(NEGOTIATE)) | |

FIG. 11

ACTION CODES AND DESCRIPTIONS FOR INPUT iHMerge.

| CODE | DESCRIPTION | COMMENTS |
|---|---|---|
| A40 | 1. OVERWRITE tmp.HELLO WITH HELLO USING THE dxxx FIELDS | COLLECT "BETTER" INFORMATION |
| A41 | 1. SAVE HELLO IN tmp.HELLO USING THE dxxx INFORMATION<br>2. START HBTimer | USE DESTINATION INFO |
| A42 | 1. AS A54 USING THE dxxx INFORMATION FROM THE HELLO(MERGE) | |
| A43 | 1. SAVE HELLO FIELDS IN LOCAL VARIABLES USING THE dxxx INFORMATION FROM THE HELLO(MERGE)<br>2. START KATimer | |
| A44 | 1. TRANSMIT (HELLO(MAA)) | |

FIG. 12A

ACTION CODES AND DESCRIPTIONS FOR INPUT iMAA.

| CODE | DESCRIPTION | COMMENTS |
|---|---|---|
| A50 | 1. SAVE HELLO FIELDS IN LOCAL VARIABLES<br>2. JOIN (vGroupid)<br>3. vMember: = TRUE<br>4. START KATimer | A (RE)STARTED LAN ACCESS AGENT ATTACHES TO A FUNCTIONING MAG |
| A51 | 1. IF vMember == TRUE AND HELLO(groupid) =/= vGroupid<br>   LEAVE (vGroupid)<br>   vMember: = FALSE<br>2. SAVE HELLO FIELDS IN LOCAL VARIABLES<br>3. IF vMember == FALSE<br>   JOIN (vGroupid)<br>   vMember: = TRUE<br>4. START KATimer | CHANGE GROUPS IF REQUIRED BY THE NEW MAA |
| A52 | 1. OVERWRITE tmp.HELLO WITH HELLO | COLLECT "BETTER" INFORMATION |
| A53 | 1. SAVE HELLO IN tmp.HELLO<br>2. START HBTimer | SAVE RECEIVED HELLO IN TEMPORARY VARIABLE |

| | | |
|---|---|---|
| A54 | 1. MERGE(HELLO.Groupid,vGroupid)<br>2. IF (SUCCESSFUL)<br>   TRANSMIT (HELLO(MERGE))<br>   SAVE HELLO FIELDS IN LOCAL VARIABLES<br>3. ELSE<br>   LEAVE (vGroupid)<br>   SAVE HELLO FIELDS IN LOCAL VARIABLES<br>   JOIN (vGroupid)<br>4. START KATimer | THE CURRENT MAA YIELDS TO ANOTHER AND MERGES ITS MAG WITH THAT OF THE WINNING MAA |
| A55 | 1. START KATimer<br>2. IF HELLO.AA ADDRESS LIST PRESENT UPDATE vMEMBERSHIP LIST. | |
| A56 | 1. TRANSMIT (HELLO(MAA)) | |

FIG. 12B

| FIG. 12A |
|---|
| FIG. 12B |

FIG. 12

AA1 (GROUP LEADER)

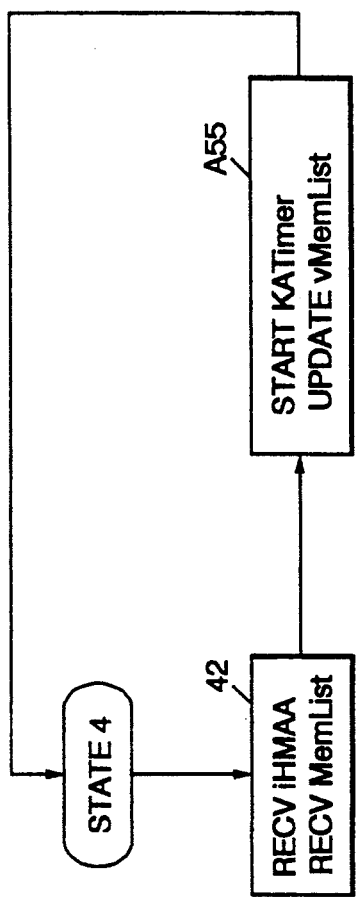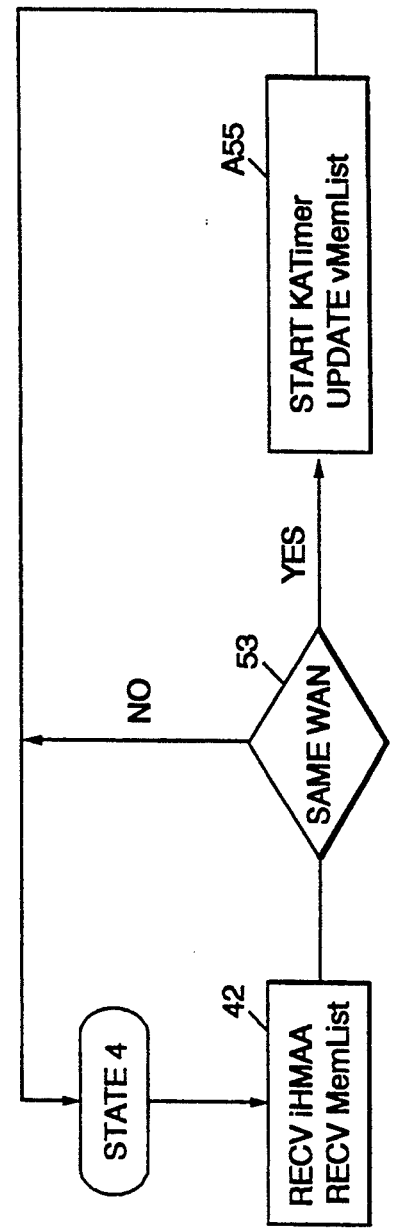

AA3 & AA4

AA1 & AA3

AA2 & AA4

AA1 (GROUP LEADER)

AA3 & AA4

FORMING AND MAINTAINING ACCESS GROUPS AT THE LAN/WAN INTERFACE

CROSS REFERENCE TO RELATED PATENTS

The present invention relates to the following patents which are specifically incorporated herein by reference:

1. "Distribution Management Communications Network," U.S. Ser. No. 07/900,647, filed Jun. 18, 1992, and
2. "Maintenance of Message Distribution Trees in a Communication Network," U.S. Ser. No. 07/923,125, filed Jul. 31, 1992.

BACKGROUND OF THE INVENTION

1. Field of the Invention

This invention relates to the formation and maintenance of groups of network-node access agents that interconnect a Local Area Network (LAN) with a Wide Area Network (WAN). More particularly, the invention relates to access agents cooperating with each other to choose a group leader, or join as a group member.

2. Description of Prior Art

Access agents are intelligent communication subsystems located in network nodes at the interface between a Local Area Network (LAN) and a Wide Area Network (WAN). The access agents control the flow of communications between the LAN and the WAN. Typically, there is more than one network node and, thus, more than one access agent between a LAN and a WAN. Also, a given LAN may be composed of multiple LAN segments connected by communication bridges (links between LAN nodes in separate LAN segments). Thus, there may exist multiple paths between a given LAN end station and an access agent in a network node at the LAN/WAN interface.

In the prior art, the access agents have been managed in such a way that communication work across the LAN/WAN interface selected one access agent based on a predetermined criteria, such as cost. Once the optimum access agent for a given communication was selected, all other access agents, that could also be used to perform the same work, were blocked, or shut down. As a result, multiple communication jobs were queued and waited in line for the optimum access agent to handle them in turn.

The problem with the prior art design is that it wastes the communication power available at the interface between the LAN and WAN. If the access agents could be managed in a manner to split the workload between multiple access agents, then multiple communication jobs could be performed in parallel, and the total communication workload completed more quickly. However, this means that the access agents must be formed into a group, and each access agent in the group must be managed so that the access agents perform the total workload as a group with communication jobs being performed in parallel. To date, there are no communication systems having LAN/WAN access agents that are so formed and managed to perform total communication workload, i.e., multiple jobs, as a group.

SUMMARY OF THE INVENTION

It is an object of this invention to establish an environment in a network for group management of access agents at a LAN/WAN interface.

In accordance with this invention, the above object is accomplished by organizing all access agents attached to a common LAN, including all connected LAN segments, into an access agent group. More particularly, this is accomplished by forming all such access agents into a Multiple Access Group (MAG). In addition, the group must maintain group operation integrity in that if communications between agents in the group are broken, the access agents will coalesce into subgroups and continue performing communication jobs as a group activity.

The formation of interconnected access agents into a group is accomplished by one access agent being identified as a group leader. All other access agents, that share LAN and WAN connectivity with the group leader, may then join the group.

The maintenance of group operation integrity is accomplished by detecting a break in group communication integrity, and thereafter reforming the group as a single group or multiple subgroups. The break in group integrity may be caused by a group leader dropping out, by a breakdown in communication across a bridge between two LANs, or by a WAN splitting. In the latter two breaks, the group will reform, or coalesce into subgroups. In the case of the group leader dropping out, the remaining access agents will select a new group leader and reform as a single group. The maintenance of group activity integrity also includes detecting the addition, or repair, of a bridge between LAN segments, and thereafter merging small groups in the LAN segments into a large group for the LAN.

Other objects, advantages and features of the invention will be understood by those of ordinary skill in the art after referring to the complete written description of the preferred embodiments in conjunction with the following drawings.

BRIEF DESCRIPTION OF THE DRAWINGS

FIG. 2 is a chart to illustrate the organization of the finite state machine table in FIG. 3 and the interrelation of FIG. 3 table to tables in FIGS. 4 through 12.

FIG. 3 is a finite state machine table and illustrates the preferred embodiment of the invention implemented as a finite state machine in each of the access agents.

FIG. 4 is a table of inputs to the finite state machine.

FIG. 5 is a table of conditions that are also inputs to the finite state machine. The inputs of FIG. 4 and the conditions of FIG. 5 combine, as shown in FIG. 3, to cause actions and changes of state by the finite state machine.

FIG. 6A is a table of definitions for the states of the state machine.

FIG. 6B is a table of definitions for the WAN group management services.

FIG. 6C is a table of definitions for the local variables stored at each access agent and used by its finite state machine.

FIGS. 7-12 are tables of action codes called for in the finite state machine of FIG. 3, and the actions performed by the state machine when that code is called.

FIGS. 14A-14D show the logic/flow performed by finite state machines in the access agents to maintain group operation integrity when the bridge between LAN segments break.

FIGS. 16A–16D show the logic/flew performed by finite state machines in the access agents to maintain group operation integrity when the WAN connected to bridged LAN segments splits into two WANs.

DESCRIPTION OF THE PREFERRED EMBODIMENTS

Figure 1:
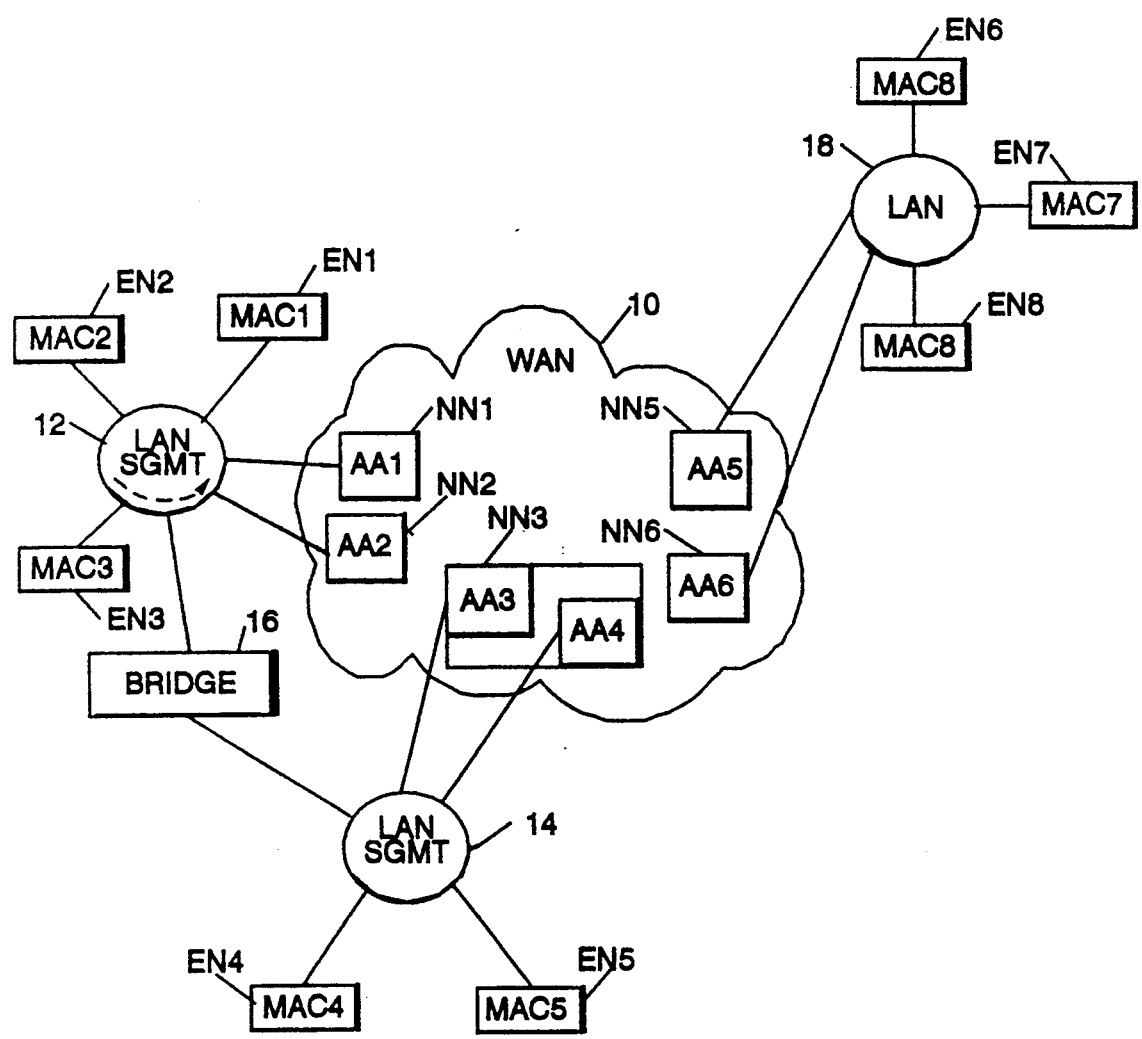
FIG. 1 is an example of a LAN and WAN system in which the invention's group management of access agents is used.

In FIG. 1, there is an example of multiple LAN segments connected to WAN 10. In accordance with this invention, the Access Agents (AAs) connected to the same LAN, including bridged LAN segments, will form themselves into and maintain themselves as a Multiple Access Group (MAG).

Each of the Access Agents (AAs) are located in a network node at the interface to a LAN. A network node may have more than one AA. In each LAN, there are multiple end nodes ENs, and each end node contains a Media Access Control (MAC) that connects the end node communication device to the communication media. For example, the communication media may be a token ring network, as shown in FIG. 1, an APPN network, or an Ethernet network. The end nodes may be terminals, personal computers, hosts, work stations, LAN servers, etc.

Network nodes NN1 and NN2 contain access agents AA1 and AA2 for LAN segment 12. Network node NN3 contains two access agents AA3 and AA4 for LAN segment 14. LAN segment 12 and LAN segment 14 are connected to each other by bridge 16. Accordingly, end nodes EN1–EN5 can be connected to WAN 10 through any of the access agents AA1–AA4.

Access agents AA1–AA4 will be grouped as four AAs in a multiple access group (MAG) for bridged LAN segments 12 and 14. LAN 18 has three end nodes, EN6–EN8, and two access agents, AA5 and AA6. Access agents AA5 and AA6 would be formed into a second MAG attached to WAN 10.

Structure of Invention

Each of the access agents can be a microprocessing system programmed to communicate with other access agents to form, and maintain, a Multiple Access Group (MAG). Alternatively, for high speed, the access agents could have combinatorial logic to perform the program processes necessary to set up and maintain the MAG. In the preferred embodiment of the invention, the access agents contain mixed structure—logic and microprocessor. The high volume tasks of the invention would be performed by combinatorial logic, and the lower volume tasks would be handled by a programmed microprocessing system. In either case, the functions and tasks performed by the invention are detailed in the finite state machine table, shown in FIG. 3, in accordance with the definitions in supporting tables in FIGS. 4–12.

The organization of the Finite State Machine (FSM) table in FIG. 3 is illustrated in FIG. 2. The top-most row in the FSM table identifies the columns. The leftmost column contains the inputs and conditions that will cause a change in state. After the input/conditions column, the other six columns identify the states of the state machine, whether embodied in a programmed microprocessor, combinatorial logic or both. The six states are reset, negotiate, pending, merge, assigned, and MAA (Monitor Access Agent).

In each state column, the row contains the action code, and the state number of the next state when the input and conditions for that row have been satisfied. For example, if the state machine in an access agent is in State 3, and the input is iHBTimer (described hereinafter), the column/row entry is 4(A11). In other words, action code is A11, and the next state is State 4. If the column/row entry in the FSM contains "—", it indicates no change in state, and if it contains "(—)", it indicates no action to be taken. For example, in State 2, Pending, if iHBTimer signal occurs, the column/row entry is "—(—)" which indicates no action to be taken, and no change in state.

Some column/row entries in the finite state machine table of FIG. 3 contain "/". The "/" indicates an error condition. For example, when an access agent is in State 0, the receipt of an input message, iHNeg under conditions C1, C2 or C5, is an error.

FIG. 2 is also a map illustrating the relationship of other figures to the finite state machine table in FIG. 3. The iINPUTs are defined in FIG. 4. The conditions Cx are defined in FIG. 5. FIG. 6A defines the six states for the finite state machine. FIG. 6B defines services provided by WAN Group Management that may be called upon by the finite state machine. FIG. 6C defines the local variables stored in, and used by, an access agent, and also indicates the initial values for these variables. FIGS. 7–12 define the functions of the action codes Axx. The action codes are organized in FIGS. 7–12 by the activity associated with the input message they relate to. For example, FIG. 8 relates to activity associated with the input iHBTimer (heart beat timer), while FIG. 10 relates to activity associated with the input iHNeg (hello negotiate).

In the Action Code Tables, the following nomenclature is used. "v" as the first letter in the name of a variable indicates it is a variable in the access agent executing the process flow. If there is no first letter "v" the variable is input information from another access agent. "Leave" refers to notifying the WAN that the access agent sending the "Leave" is no longer a member of a MAG (Multiple Access Group) identified in the Leave message. "Join" refers to notifying the WAN that the access agent sending the "Join" is now a member in the MAG identified in the Join message. Other terms and expressions used in the Action Code Tables will be clear from the following description of the operation of the invention.

Operation of Invention

In describing the operation of the invention, it should be noted that the labels for the access agents (AA1, AA2, AA3, . . . ) also denote their addresses, and the addresses increase with the access agent label (AA1<AA2<AA3 . . . ). Also, note that the communication between access agents as described hereinafter takes place on the LAN side of the interface unless the communication is described as being on the WAN side.

Figure 13:
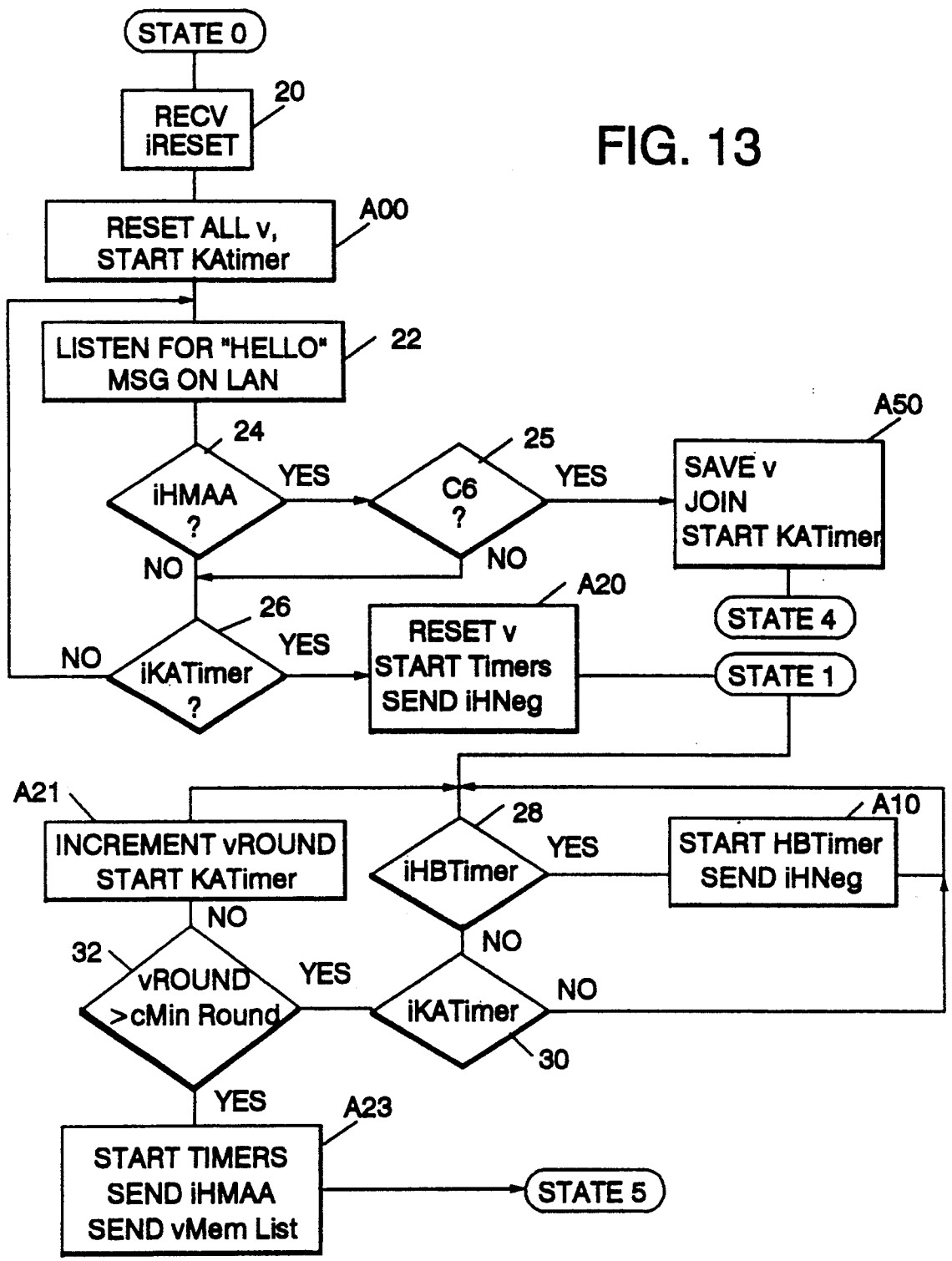
FIG. 13 illustrate the logic/flow performed by finite state machines in the access agents to form a group of access agents.

The first task of the invention is to form access agents connected to a given LAN into a group. The finite state machine in each of the access agents AA1–AA4 (FIG. 1) follows a process flow, as shown in FIG. 13. The process flow in FIG. 13 assumes the state machine in one access agent powers up first, and asserts itself as group leader or MAA (Monitor Access Agent) before any other access agent powers up. The process for negotiating conflicts between two or more access agents that assert themselves as MAA will be described hereinafter.

Referring to FIGS. 3 and 13, we will assume that access agent AA1 powers up first. The finite state machine in AA1 starts in State 0, Reset. During power up, the iReset message will be generated. When this message is received in operation 20, AA1 executes action code A00 which resets all of AA1's variables, and starts the Keep Alive Timer (KATimer). AA1 listens for Hello messages from other access agents in operation 22, but the assumption in FIG. 13 is that AA2–AA4 have not yet powered up. Accordingly, there is no iHMAA (Hello.MAA) message received, and decision 24 branches process flow to decision 26. Decision 26 tests for expiration of the Keep Alive Timer. If KATimer has not timed out, process flow returns to listen 22. This loop through 22, 24 and 26 will continue until KATimer times out (several seconds). If KATimer times out before a iHMAA (Hello.MAA) is received, process flow from decision 26 branches Yes.

After KATimer expires, the iKATimer message is received by the finite state machine (FSM). The FSM (FIG. 3) is in State 0, and KATimer has expired with the variable vRounds<cMinRounds; therefore, the FSM performs action A20 and switches to State 1. (The variable vRounds is a count of the number KATimer expirations. The constant cMinRounds is a constant threshold value for a set number of KATimer expirations.) In action A20 (FIG. 9), the FSM resets all variables in AA1, starts both the HBTimer (heart beat timer) and the KATimer, and sends a Hello. Negotiate message (iHNeg). The iHNeg is a flag message to other access agents that AA1 is negotiating for the group leader position.

Decision 28 tests for expiration of the heart beat timer (HBTimer). The HBTimer times out in approximately one second. Each time HBTimer expires, decision 28 branches Yes and the FSM (FIG. 3), being in State 1, goes to action A10 (FIG. 8). In action A10, AA1 sends another iHNeg message and restarts the HBTimer. If the HBTimer has not expired, decision 28 branches to decision 30 that tests for expiration of the KATimer. If the KATimer has not expired, the process flow loops back to decision 28. If KATimer has expired, decision 32 tests whether the vRound exceeds cMinRound; i.e., the number of KATimer expirations exceeds a given threshold value. If the threshold has not been exceeded, FSM (FIG. 3) goes to action A21 (FIG. 9). Action A21 increments the vRound variable by one, and restarts the KATimer. Loops through decisions 28 and 30 continue until decision 32 is satisfied indicating the KATimer expirations have exceeded the threshold value. The FSM (FIG. 3) performs action A23 (FIG. 9), and switches to State 5. In action A23, the HBTimer and KATimer are restarted, and the iHMAA message is sent with the vMembership List In effect, AA1 has said, "I'm group leader and here is the list of group members."

At this point, there is only one member AA1 who is also group leader. This is because the assumption in FIG. 13 was no other AAs had powered up until AA1 had become group leader. Now, after AA1 is group leader, as AA2, AA3 and AA4 power up, they go through the process in FIG. 13. However, now at every heart beat interval, there will be an iHMAA message on the LAN from AA1. This is because AA1 is in State 5 and each time the HBTimer expires (iHBTimer input), the FSM in AA1 performs action A12 (FIG. 8).

The FSMs in AA2, AA3 and AA4 will hear a Hello message at operation 22 in FIG. 13, and decision 24 will branch Yes to decision 25. Decision 25 tests that the vMAA address stored in the current AA is greater than the MAA address received in the Hello message from AA1. At power-on or reset, the vMAA address for an access agent is set to a maximum number. Therefore, AA2, AA3 and AA4 will all have the maximum number stored as the vMAA address. The iHMAA message will contain the real address for AA1 which will be less than the maximum. Thus, decision C6 will branch Yes. Each FSM in AA2–AA4 will perform action A50 and switch to State 4. Action A50 (FIG. 12) saves the variables in the Hello message from AA1, sends the Join message with the Groupid (group identification) to the WAN, sets the vMember variable to true (current AA is now a member of a group), and restarts the KATimer in the AA. In this manner, AA2, AA3 and AA4 join AA1's MAG (Multiple Access Group).

Figure 14A:
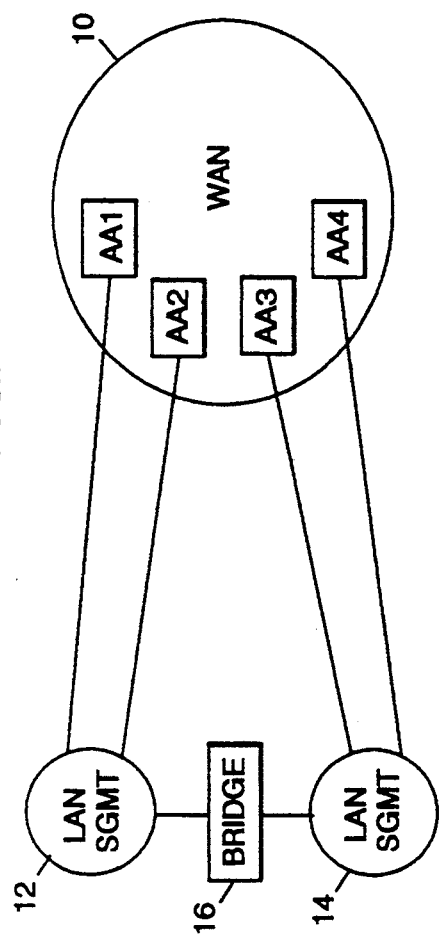

Once the MAG is formed, the task of the AAs is to maintain group operation integrity; i.e., to continue to operate as a group in response to service requests from the LAN or WAN. A number of events can break group integrity. In FIG. 14A, one of these events, bridge 16 breaking, is shown. With bridge 16 down, end nodes in LAN segment 12 can no longer connect to access agents AA3 and AA4. Likewise, end nodes in LAN segment 14 can no longer connect to access agents AA1 and AA2. AA1 and AA2 can no longer communicate with AA3 and AA4 over the LAN.

Figure 14B:
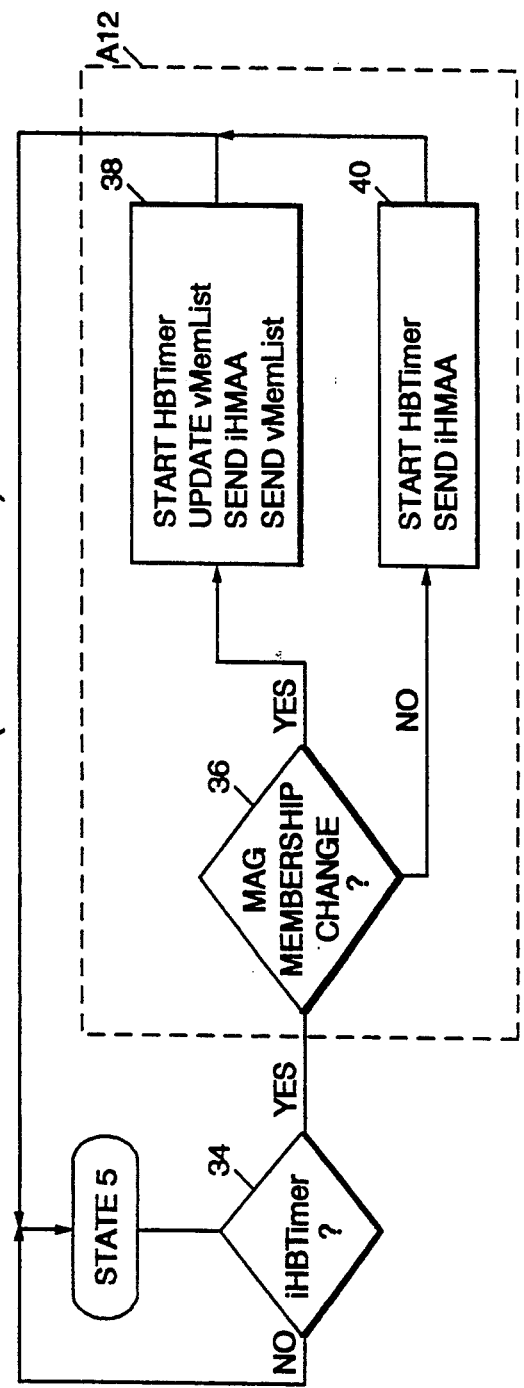
Figure 14D:
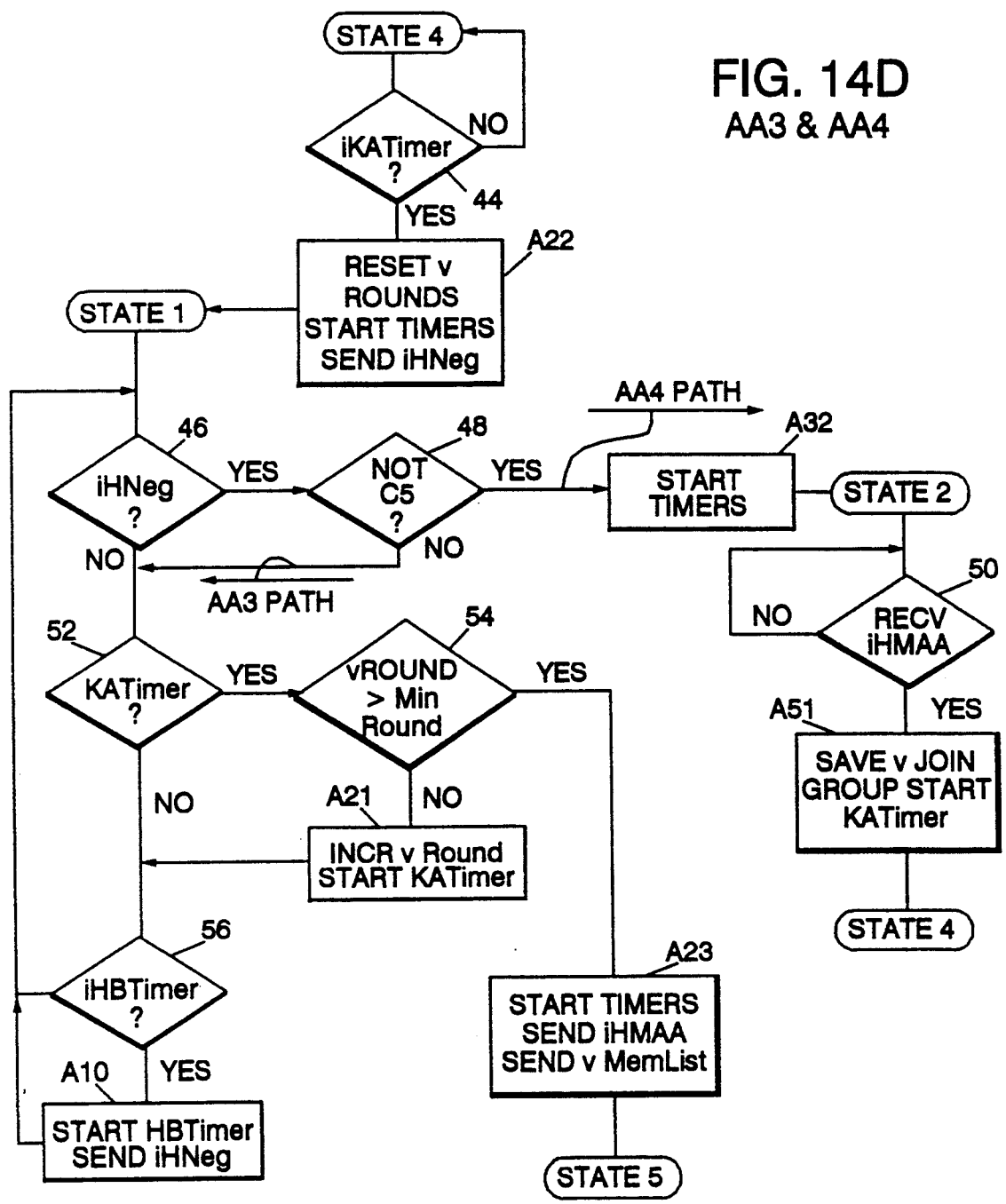

To maintain group activity, the access agents need to reform into two groups or subgroups. The flow diagrams in FIGS. 14B, 14C and 14D illustrate the process performed by the finite state machines in AA1, AA2, and AA3 and AA4, respectively, as the access agents broken as a large group coalesce into two smaller groups. In FIG. 14B, the group leader AA1 sees the group reduced by two. In FIG. 14C, AA2 sees the group reduced by two also. In FIG. 14D, AA3 and AA4 lose their group leader, and contend with each other to become the new group leader of a group containing just AA3 and AA4.

In FIG. 14B, AA1 is in State 5 as group leader. Decision 34 tests for expiration of the HBTimer. When it expires, the Finite State Machine (FSM, see FIG. 3) performs action A12 (FIG. 8). In action A12, decision 36 tests for a membership change message from the set manager in WAN 10. The set manager is described in copending commonly assigned patent applications, U.S. Ser. No. 07/900,647, entitled "Distribution Management Communications Network," and filed Jun. 18, 1992, and U.S. Ser. No. 07/923,125, entitled "Maintenance of Message Distribution Trees in a Communication Network," and filed Jul. 31, 1992, which are hereby incorporated by reference. If a membership change message has been received, operation 38, by the FSM in AA1, includes start HBTimer, Update vMembership List, send iHMAA, and send vMembership List. In other words, AA1 puts a message on its attached LAN (now single segment LAN 12) that it is the leader, and the members of its group are AA1 and AA2.

In FIG. 14C, AA2 is in State 4 as an assigned member of AA1's group. In operation 42, the Finite State Machine (FSM) in AA2 receives the iHMAA message and the Membership List from AA1. The FSM (FIG. 3) input is iHMAA with condition C7 and, therefore, the FSM performs action A55 (FIG. 12). In action A55, the FSM restarts the KATimer, updates the vMembership List in AA2 with the Membership List received from AA1. AA2 stays in State 4.

FIG. 14D shows the process followed by the Finite State Machine (FSM) in each of the access agents AA3 and AA4. When the KATimer expires, as detected by decision 44, it means that AA3 and AA4 have not received an iHMAA, group leader message, as did AA2 in FIG. 14C for the time interval of the Keep Alive Timer. Normally, they would receive the iHMAA each interval of the HBTimer. The FSM goes to action A22 where it resets the vRounds count to zero, restarts the KATimer and HBTimer and sends the iHNeg (Hello Negotiate) message. This happens in both AA3 and AA4; i.e., both access agents ask to be group leader.

Decision 46 tests for receipt of an iHNeg message. If the message has been received, decision 48 compares the AA address in the iHNeg message with the address of its own AA, vAA address. This is the conflict resolution process between AAs requesting to be group leader at the same time. The rule is the AA with the lowest address becomes group leader. Other rules for ranking the access agents, such as highest address wins, might be used. Since AA3 has the lower address (3<4), the condition NOT C5 is satisfied, AA4 loses, and its FSM (FIG. 3) performs action A32 (FIG. 10), start Timers, and switches to State 2. In State 2, AA4 waits to receive (50) an iHMAA (from AA3) and when it does, its FSM performs action A51. In action A51, the variables information received in the iHMAA are saved by AA4 as its variables v, AA4 sends a Join the group message to the WAN indicating it is joining AA3's group, and AA4 starts its KATimer.

Since AA3's FSM wins the conflict resolution at its decision 48, the process flow in AA3 proceeds to decision 52. The process loops through decision 52, decision 54, action A21, decision 56, action A10, and back to decision 46. In each HBTimer interval in this loop, AA3 sends another iHNeg (Hello.Negotiate) message. When the KATimer has expired the number of times that exceeds the preset threshold, the process flow branches Yes at decision 54. The FSM then performs action A23 (FIG. 9) and switches to State 5. AA3, in action A23, has assumed the role of group leader by restarting the timers, sending the iHMAA message and the vMembership List for the group. This completes the formation of two groups, AA1-AA2 and AA3-AA4, resulting from the splitting of the bridged LAN into two LANs.

Figure 15A:
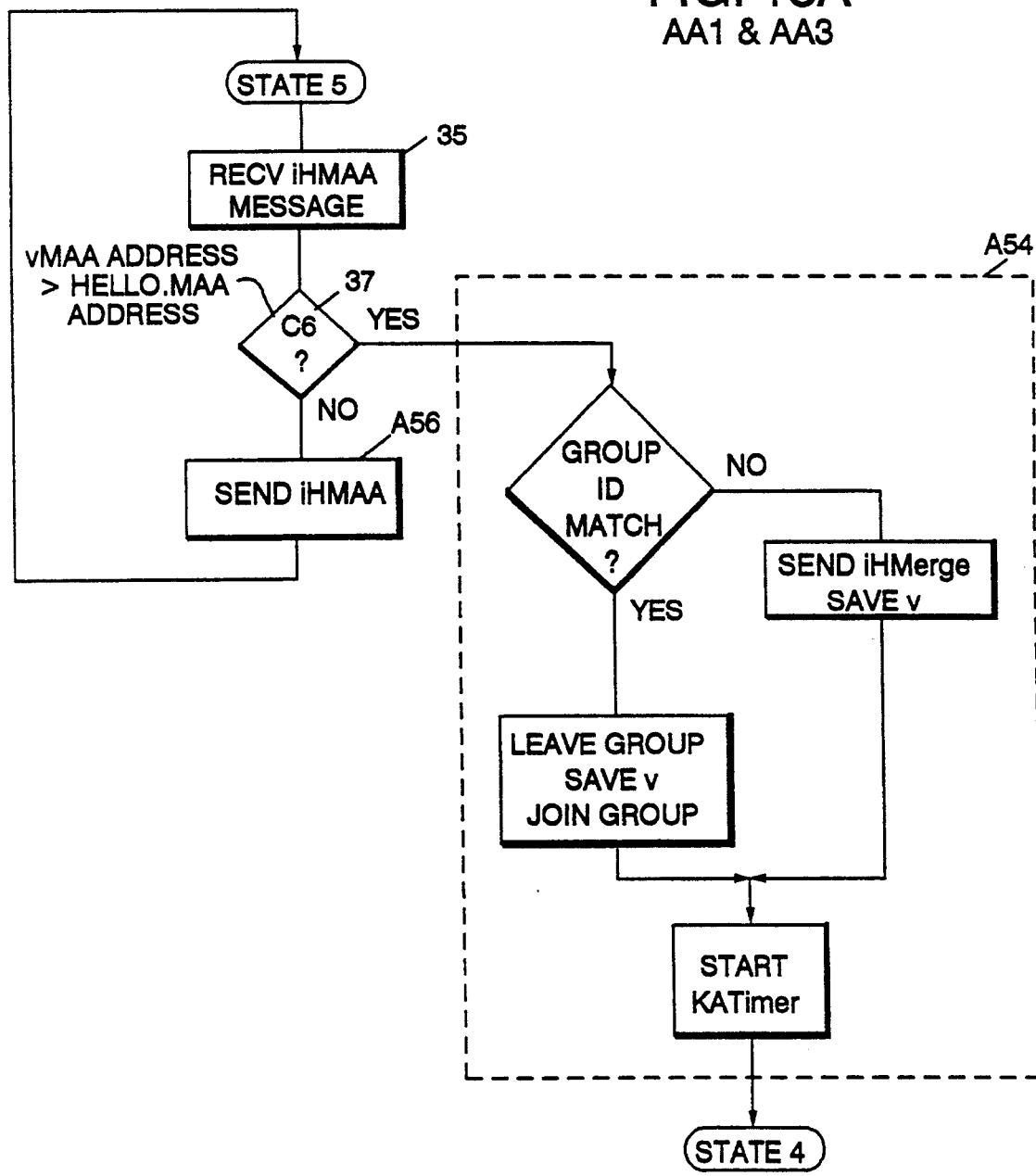
FIGS. 15A and 15B show the logic/flow performed by finite state machines in the access agents when a bridge between LAN segments is repaired, or added, requiring the merger of two groups into a single large group of access agents.
Figure 15B:
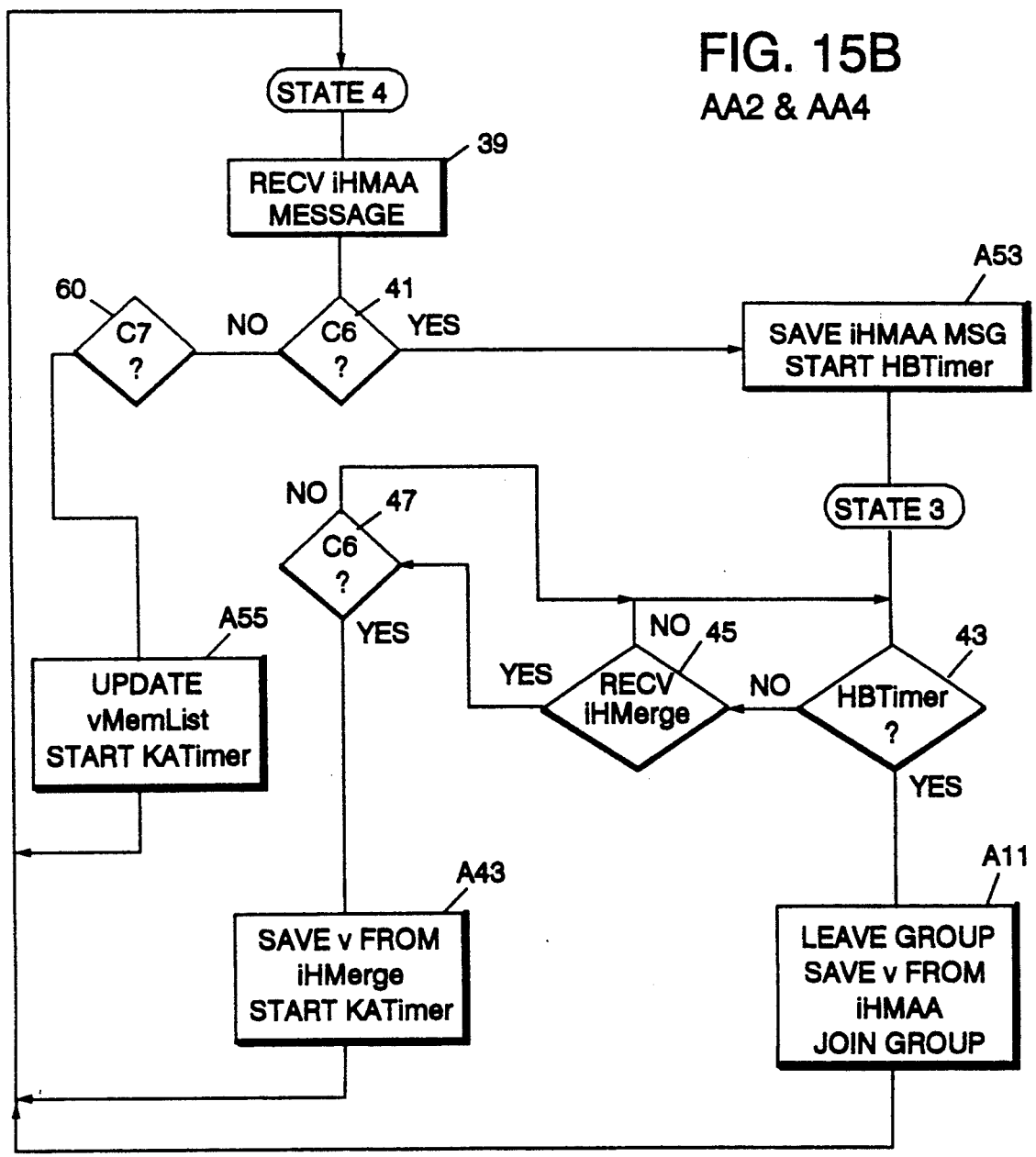

The group management system must also handle the reverse situation where a bridge is repaired between two LAN segments, or a bridge is added between two LAN segments. Assume that two access agents AA1 and AA2 are an existing group in LAN segment 12 (FIG. 1), and access agents AA3 and AA4 are an existing group in LAN segment 14. AA1 and AA3 are the respective group leaders. Now bridge 16, between LAN segments 12 and 14, is added or repaired. The group management system will reform the AAs into the large group AA1, AA2, AA3 and AA4, with AA1 as group leader. FIGS. 15A and 15B illustrate the logic/flow for the FSMs in the respective AAs.

In FIG. 15A, AA1 and AA3 start out in State 5 as group leaders. Bridge 16 now connects their two groups, and they begin receiving each others iHMAA message. They must resolve the conflict and leadership for the new larger group by one of them assuming the role of a member of the group rather than group leader.

The FSM in AA1, in operation 35, receives the iHMAA message from AA3. Decision 37 tests for Condition 6 (C6) which is whether the vMAA Address of AA1 is > the MAA address in the received iHMAA. Since the iHMAA came from AA3 and the vMAA address is for AA1, vMAA address is < the iHMAA address and C6 is not satisfied at decision 37. Therefore, FSM (FIG. 3) in AA1 performs action A56, and stays in State 5. In action A56, AA1 again sends its iHMAA message; i.e., it is still the group leader.

The FSM in AA3 receives the iHMAA from AA1 in operation 35. At its decision 37, the C6 condition is satisfied, and the FSM performs action A54 and changes to State 4. In action A54, AA3 invokes the group management merge operation. That operation tests whether the group ID of the new group is different from AA3's previous group ID. If the group ID's are different, AA3 sends to members of his old group iHMerge, with the new variables containing information about the new group. If the group ID's are not the same, AA3 leaves its old group, and joins the new group now lead by AA1. In both cases, AA3 saves the information in the iHMAA message as its local variables v. Last, as a part of action A54, AA3 starts the KATimer.

In FIG. 15B, AA2 and AA4, which are in State 4, merge with the new larger group. AA2, which was already in a group with AA1, changes groups in the sense of moving from its older small group to the new large group. AA4, which was in a group with AA3, changes to the new group leader. The FSMs in AA2 and AA4, at operation 39, receive the iHMAA message from AA1. At decision 41, condition C6 (discussed above in reference to FIG. 15A) is satisfied for AA4, and not satisfied for AA2. In other words, the Monitor Access Agent (AA1) stays the same for AA2 but has changed for AA4.

From decision 41, the FSM in AA2 goes to decision 60 that tests whether the vMAA.address stored in AA2 matches the MAA.address in the received iHMAA message. In AA2's case, there is a match since AA1 is still its group leader. The FSM then performs action A55. In action A55, AA2 receives the membership list for the new group, and then starts the KATimer. AA2 stays in State 4.

From decision 41, the FSM in AA4 performs action A53, and goes to State 3. In action A53, the FSM saves the iHMAA message contents, including MAA.address (new group leader address), in temporary storage, and restarts the HBTimer. In State 3, AA4 is in the Merge state, and must now merge into the new group.

AA4, at decision 43, tests for expiration of the HBTimer. If the HBTimer has not expired, decision 45 tests for receipt of iHMerge from AA3 (FIG. 15A). If there is no iHMerge message, the flow loops back to decision 43. If the iHMerge message has been received, decision 47 tests for whether the MAA address in the iHMerge message is the same as the vMAA.address of the new leader just temporarily stored by AA4 during action A53. If the answer is no, the iHMerge message is not from AA3 (see FIG. 15A), and the FSM flow returns to decision 43 testing HBTimer expiration. This loop for AA4 will continue until the MAA.address in iHMerge matches the MAA.address of the new leader or until the HBTimer expires. If the HBTimer expires, then the FSM in AA4 performs action A11. In A11, the FSM leaves the old group, saves as its variables the information for the new group from the iHMAA, and joins the new group. The FSM for AA4 then goes to State 4.

If the answer to decision 47 is yes, the FSM in AA4 performs action A43. In A43, the FSM saves as the local variables the information on the new group that was contained in the iHMerge message from AA3 (FIG. 15A). The FSM then restarts the KATimer, and returns to State 4. AA4 is now a member of the new group with a new group leader.

This completes the transition from two small groups to a larger group when two LAN segments are bridged.

The group management system must also maintain group operation integrity in the event the group leader fails. If AA1, the current group leader, were to fail, each of the other AAs would sense the lack of an iHMAA message during a keep alive timer interval. In other words, an iHMAA message with a Condition C7 is required in State 4 (see FIG. 3) to restart the KATimers in each assigned AA. When the KATimer times out because there has been no iHMAA, they will send an iHNeg message to begin the negotiation for position as group leader. In effect, each of AA2, AA3 and AA4 will follow the logic/flow in FIG. 14D, previously described, until the process chooses a new group leader. Since AA2 has the lowest AA address, it will emerge as the new group leader.

Figure 16A:
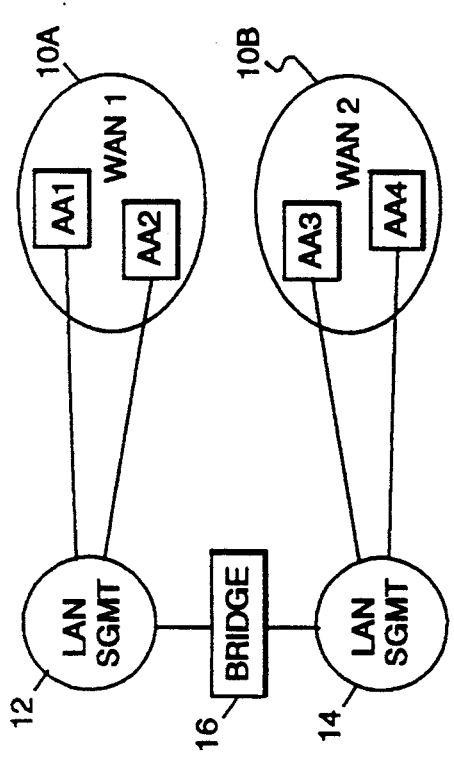

The group management system must also maintain group operation integrity in the event the WAN splits for any reason. This situation is illustrated in FIG. 16A. The AAs in a large group AA1–AA4 are now separated on the WAN side of their communications. AA1 and AA2 can still communicate with AA3 and AA4 though LAN segments 12 and 14, and bridge 16. However, WAN 10 has now split into two WANs, 10A and 10B, so there is no communication between AA1–AA2 and AA3–AA4 via nodes in the WAN. Therefore, it is necessary to form two small groups from the previous larger single group of AAs.

Figure 16B:
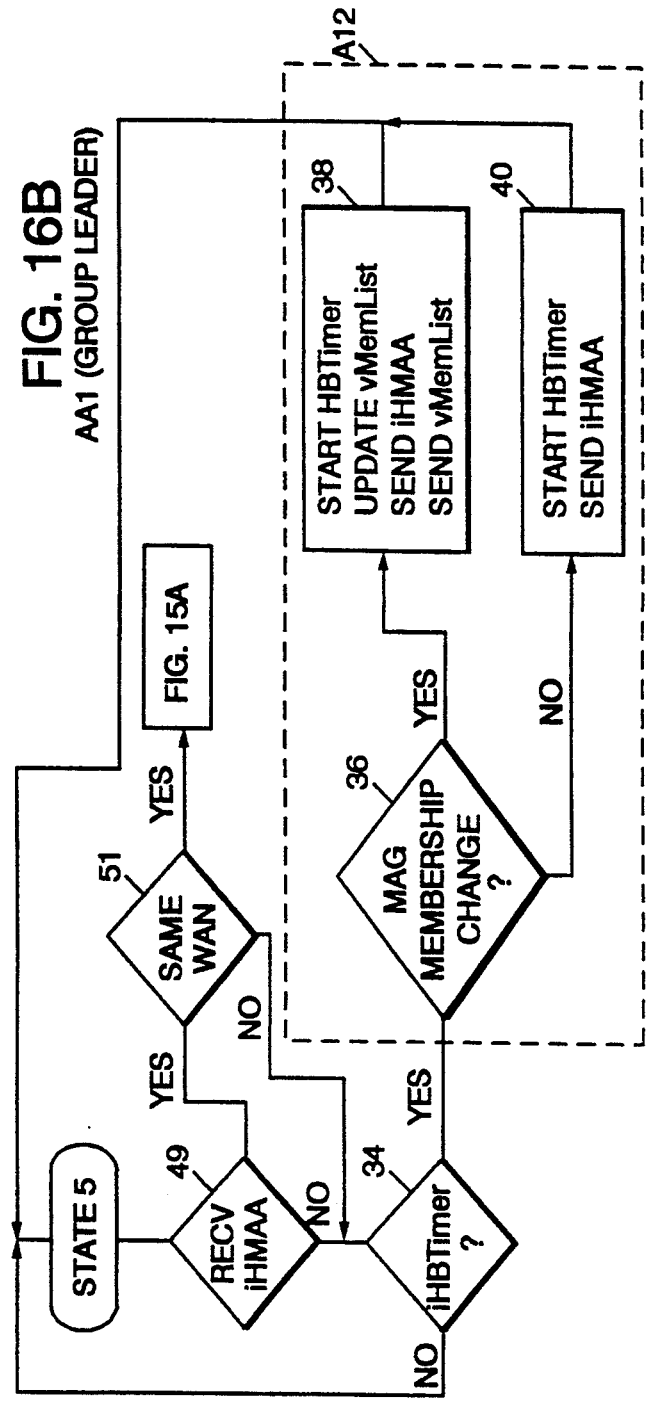
Figure 16D:
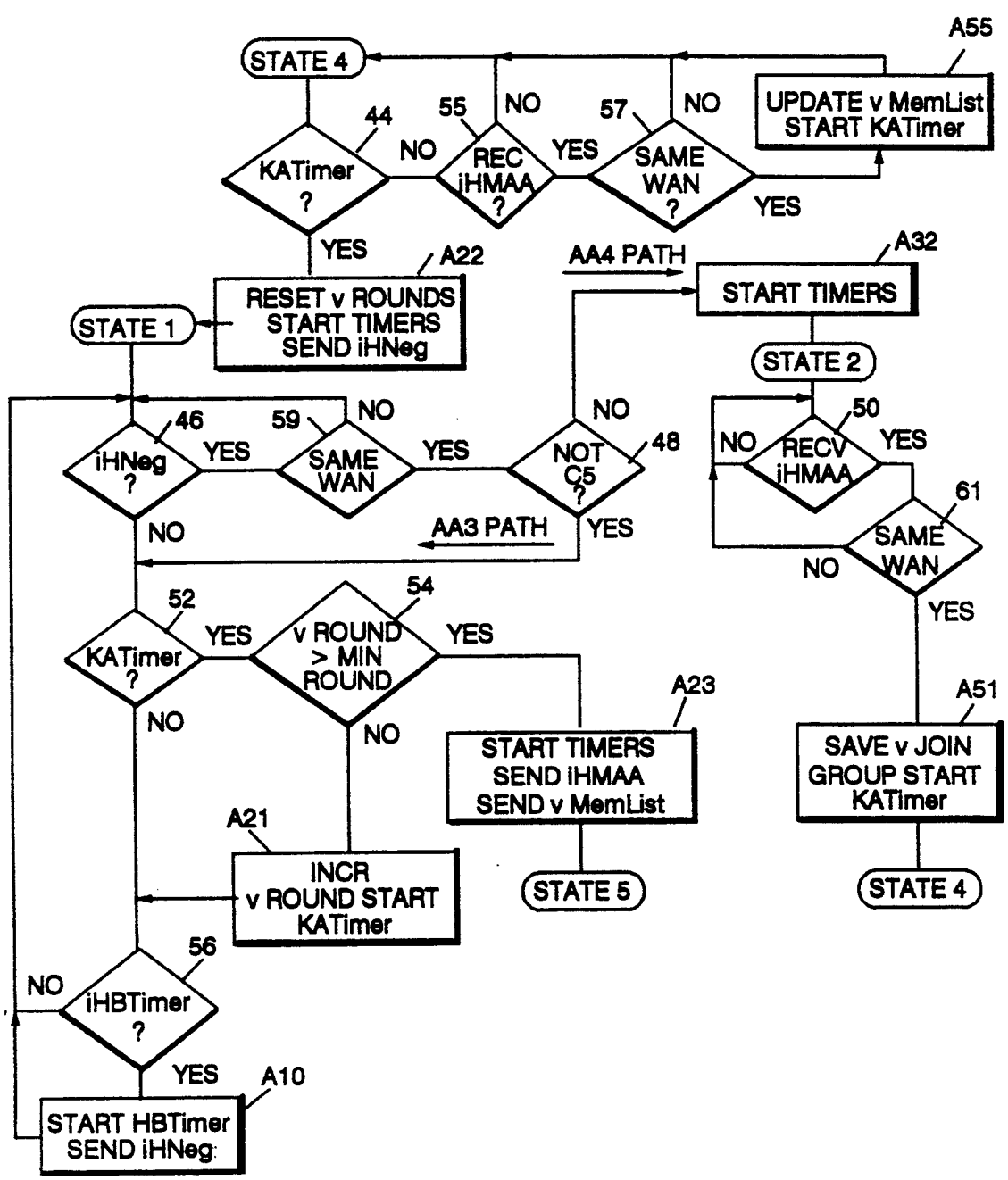

The affect of the WAN split on the group management system is similar to bridge 16 failing between LAN segments 12 and 14, which was previously described with reference to FIGS. 14A–14D. FIGS. 16B–16D are the same as FIGS. 14B–14D, except additional operations have been added to handle the condition C8 used in a WAN split.

Condition C8 requires the WANid, stored as a variable by the current AA, to be the same as the WANid received in a Hello message from another AA. If the WANid's are not the same, the two AAs are in different WANs; i.e., the WAN has split. Since FIGS. 16B–16D are substantially the same as FIGS. 14B–14D, only the differences in the figures will be described.

In FIG. 16B, the FSM in AA1 is in State 5 as AA1 is the group leader before the WAN split. Decision 49 tests for receipt of an iHMAA message. If such a message is received, decision 51 tests for whether the message came from an AA with the same WANid; i.e., condition C8. If the WANid is the same, the FSM has to deal with a conflict between two AAs claiming to be group leader. The logic/flow to resolve such a conflict is described above in reference to FIG. 15A. If the WANid's are not the same, AA1 knows the WAN has split, and it is necessary to reform the AAs into two groups. The logic flow proceeds from decision 51 to decision 34 which tests for expiration of the HBTimer. The flow in FIG. 16B is then the same as the flow described above for FIG. 14B.

In FIG. 16C, AA2 is in State 4 as it is assigned to AA1's group. When the FSM in AA2 detects receipt of an iHMAA message in operation 42, it checks the WANid in that message at decision 53. If vWANid in AA2 matches the WANid in the message, the FSM proceeds to action A55 previously described. If the WANid's do not match, AA2 takes no action and stays in State 4. No match would indicate the iHMAA came from an AA attached to another WAN, and AA2 would not be a part of that AA's group.

In FIG. 16D, AA3 and AA4, which were in State 4 assigned to AA1, must form a new group and select a new group leader since they are in a WAN 10B (FIG. 16A). If the KATimer has not expired, the FSMs in AA3 and AA4 test for receipt of an iHMAA message at decision 55. If such a message has been received, decision 57 tests for whether the WANid in the message matches the vWANid stored in AA3 and AA4, respectively. If there is a match, the FSM would perform action A55. If the iHMAA comes from AA1, which now has a new WANid, there will be no match, and the logic/flow of the FSM for AA3 and AA4 returns to State 4 until the KATimer expires.

Decision 44 detects expiration of KATimer, and the FSMs in AA3 and AA4 perform action A22. AA3 and AA4 are now in the negotiation state, as previously described in FIG. 14D. The negotiation operation in FIG. 16D differs in that decision 59 has been added to check the WANid in any received Hello.Negotiate message. This is necessary since bridge 16 might pass an iHNeg message from an AA attached to WAN 10A (FIG. 16A). If the WANid's do not match, the FSM loops back to decision 46 (only AAs with the same WANid can contend for group leadership or be in the same group).

If the WANid's match, decision 48 tests for condition C5 to resolve the conflict in group leadership between AA3 and AA4. AA3's path and AA4's path and operations are unchanged from FIG. 14D, except that in the AA4 path, the FSM checks the WANid at decision 61 when an iHMAA is received. This is necessary since bridge 16 (FIG. 16A) might pass the iHMAA from AA1. Otherwise, as described before in FIG. 14D, AA3 completes its path and becomes group leader (State 5), and AA4 completes its path and joins AA3's group (State 4).

While a number of preferred embodiments of the invention have been shown and described, it will be appreciated by one skilled in the art, that a number of further variations or modifications may be made without departing from the spirit and scope of our invention.

What is claimed is:

1. For use in a plural network communication system having multiple access agents at a network-to-network interface, a cooperative method for use by each of the access agents so that the access agents form and maintain the access agents common to the interface into a group for operative use as a group by the communication system, said method in each access agent comprising the steps of:

negotiating for leadership of the group with all other access agents common to the interface by testing whether or not a group leader message has been received from another access agent in a predetermined interval of time, and sending a negotiation message to the other access agents if a group leader message has not been received;

resolving conflicts in negotiation and assuming a role of group leader or a role of member of the group; and maintaining group operation integrity after the group has been formed whereby the communication system may manage the access agents as a group.

2. The method of claim 1 wherein said step of resolving conflicts comprises the steps of:

testing whether the negotiation message from another access agent indicates the other access agent has a higher rank than the current access agent;

sending a group leader message to the other access agents if the current access agent has a higher rank; or sending a merge message to the other access agents if the current access agent has a lower rank.

3. For use in a plural network communication system having multiple access agents at a network-to-network interface, a cooperative method for use by each of the access agents so that the access agents form and maintain the access agents common to the interface into a group for operative use as a group by the communication system, said method in each access agent comprising the steps of:

negotiating for leadership of the group with all other access agents common to the interface;

resolving conflicts in negotiation and assuming a role of group leader or a role of member of the group;

maintaining group operation integrity after the group has been formed by testing whether or not a group leader message with a membership list message has been received from another access agent in a predetermined interval of time, sending a negotiation message to the other access agents if a group leader message has not been received, testing the membership list message to determine whether a group membership change has occurred if a group leader message is received, and updating the group membership list in the current access agent if group membership has changed.

4. The method of claim 3 wherein said step of resolving conflicts comprises the steps of:

testing whether the negotiation message from another access agent indicates the other access agent has a higher rank than the current access agent;

sending a group leader message to the other access agents if the current access agent has a higher rank; or sending a merge message to the other access agents if the current access agent has a lower rank.

5. For use in a plural network communication system having multiple access agents at a LAN/WAN interface, a cooperative method for use by each of the access agents so that the access agents form and maintain the access agents common to the interface into a group for operative use as a group by the communication system, said method in each access agent comprising the steps of:

negotiating for leadership of the group with all other access agents common to the interface by testing whether or not a group leader message has been received from another access agent in a predetermined interval of time, said group leader message identifies the WAN attached to said another access agent, testing, if a group leader message is received, whether the group leader message comes from an access agent attached to the same WAN as the current access agent, and sending a negotiation message to the other access agents if a group leader message from an access agent attached to the same WAN has not been received;

resolving conflicts in negotiation and assuming a of group leader or a role of member of the group; and maintaining group operation integrity after the group has been formed whereby the communication system may manage the access agents as group.

6. The method of claim 5 wherein said negotiation message identifies the WAN attached to the access agent sending the negotiation message and said step of resolving conflicts comprises the steps of:

testing whether the negotiation message from another access agent indicates the other access agent has a higher rank than the current access agent;

testing whether the negotiation message comes from another access agent attached to the same WAN as the current access agent;

sending a group leader message to the other access agents if the current access agent has a higher rank and is on the same WAN;

sending a merge message to the other access agents if the current access agent has a lower rank and is on the same WAN.

7. In a LAN/WAN communication system with network nodes at a LAN/WAN interface having access agents, each access agent for managing communications across the interface for its network node, said system having a group management system for managing communications through multiple access agents as a group, apparatus in each of said access agents for forming and maintaining as a multiple access group a plurality of access agents that share a common LAN/WAN interface and provide parallel access paths across the interface, said apparatus in each access agent comprising:

means for sending a negotiate message to other access agents in the access group to negotiate for leadership of the access group;

means for listening for negotiate message from other access agents in the access group;

means in response to no other negotiate messages within a predetermined time interval for sending a group leader message to other access agents in the access group; and means responsive to a group leader message for joining the group;

whereby one access agent sending a group leader message becomes a monitor access agent and all other access agents in the access group become members of the access group.

8. The apparatus of claim 7 and in addition:

means in said monitor access agent responsive to a membership change message from said group management system for detecting a change in access group membership; and means responsive to a change in access group membership for reforming the access agents into one or more new access groups.

9. The apparatus of claim 8 wherein said reforming means comprises:

means in said monitor access agent for sending a first group leader message and thereby said monitor access agent becomes a first monitor access agent, said sending means also sending a first group membership list message identifying the members of a first access group; and means in a member access agent for receiving the first group leader message and the first group membership list message from said first monitor access agent and updating the membership list in the member access agent.

10. The apparatus of claim 9 wherein a second group of access agents includes all member access agents not receiving a group leader message from said first monitor access agent, and apparatus in each access agent in the second group comprises:

means in response to no group leader message for sending a negotiate message to access agents in the second access group to negotiate for leadership of access agents in the second group;

means for listening for a negotiate message from other access agents in the second access group;

means in response to no other negotiate messages from access agents in the second group for sending a second-group leader message; and means responsive to the second group leader message for joining the second-group;

whereby one access agent sending a second group leader message becomes a second monitor access agent and all other access agents in the second access group become members of the second access group.

11. The apparatus of claim 10 and wherein each access agent in the second access group further comprises:

means in response to a negotiate message from other access agents in the second group for resolving leadership conflict between two or more access agents negotiating for second group leadership;

means in response to conflict resolution by said resolving means for sending a second group leader message.

12. In a LAN/WAN communication system with network nodes at a LAN/WAN interface having access agents, each access agent for managing communications across the interface for its network node, said system having a group management system for managing communications through multiple access agents as a group, apparatus in each of said access agents for forming and maintaining as a multiple access group a plurality of access agents that share a common LAN/WAN interface and provide parallel access paths across the interface, said apparatus in each access agent comprising;

means for sending a negotiate message to other access agents in the access group to negotiate for leadership of the access group;

means for listening for negotiate message from other access agents in the access group;

means in response to no other negotiate messages within a predetermined time interval for sending a group leader message to other access agents in the access group;

means in response to a negotiate message from other access agents for resolving leadership conflict between two or more access agents negotiating for group leadership;

means in response to conflict resolution by said resolving means for sending a group leader message; and means responsive to a group leader message for joining the group;

whereby one access agent sending a group leader message becomes a monitor access agent and all other access agents in the access group become members of the access group.

13. The apparatus of claim 12 and in addition:

means in the monitor access agent responsive to a WAN identifier in messages from the other access agents for detecting a change in WAN identification for the WAN attached to the access agents in the access group; and means responsive to a change in WAN identification for reforming the access agents into one or more new groups of access agents having a common WAN identifier.

14. The apparatus of claim 13 wherein said reforming means comprises:

said sending means in said monitor access agent for sending a first group leader message with a WAN identifier and thereby said monitor access agent becomes a first monitor access agent, said sending means also sending a first group membership list message identifying the members of a first access group; and means in a member access agent for receiving the group leader message with the WAN identifier and the first group membership list message from said first monitor access agent and updating the membership list in the member access agent if the WAN identifier in the group leader message matches the WAN identifier of the member access agent.

15. The apparatus of claim 14 wherein a second group of member access agents has a common WAN identifier that is different from the WAN identifier in the group leader message, each access agent in the second group comprises:

means, in response to the lack of a group leader message with a WAN identifier that matches the WAN identifier of the access agent, for sending to access agents in the second group a negotiate message with a WAN identifier common to the second group access agents to negotiate for leadership of access agents in the second group;

means for listening for a negotiate message from other access agents in the second access group;

means in response to no other negotiate messages with a WAN identifier common to access agents in the second group for sending a second-group leader message with the WAN identifier common to the second group; and means responsive to the second-group leader message for joining the second group;

whereby one access agent sending a second group leader message with a WAN identifier common to the second group becomes a second monitor access agent and all other access agents in the second group become members of the second access group.

16. The apparatus of claim 15 wherein each access agent in the second access group further comprises:

means in response to a negotiate message with a WAN identifier common to second group access agents for resolving leadership conflict between two or more access agents negotiating for group leadership of the second group;

means in response to conflict resolution by said resolving means for sending a second-group leader message with a WAN identifier common to the second access group.

17. In a plural network communication system having multiple access agents at a network-to-network interface, apparatus in each access agent cooperating with similar apparatus in the other access agents for forming and maintaining the access agents common to the interface into a group for operative use as a group by the communication system, said apparatus in each access agent comprises:

negotiation means for negotiating for leadership of the group by sending a negotiate message to all other access agents common to the interface;

means responsive to a negotiate message from another access agent for resolving conflicts in negotiation and sending a group leader message if the current access agent wins the conflict resolution or a merge message if the current access agent loses the conflict resolution; and maintaining group operation integrity after the group has been formed whereby the communication system may manage the access agents as a group.

18. The apparatus of claim 17 wherein said negotiation means comprises:

means for testing whether or not a group leader message has been received from another access agent in a predetermined interval of time; and means for sending a negotiate message to the other access agents if a group leader message has not been received.

19. The apparatus of claim 18 wherein said means for resolving conflicts comprises:

means for testing whether the negotiate message from another access agent indicates the other access agent has a higher rank than the current access agent;

means for sending a group leader message to the other access agents if the current access agent has a higher rank; and means for sending a merge message to the other access agents if the current access agent has a lower rank.

20. The apparatus of claim 17 wherein said means for maintaining comprises:

means for testing whether or not a group leader message with a membership list message has been received from another access agent in a predetermined interval of time;

means responsive to no group leader message for sending a negotiate message to the other access agents;

means for testing the membership list message to determine whether a group membership change has occurred if a group leader message is received;

means responsive to a change in group membership for updating the group membership list in the current access agent.

21. The method of claim 20 wherein said means for resolving conflicts comprises:

means for testing whether the negotiate message from another access agent indicates the other access agent has a higher rank than the current access agent;

means for sending a group leader message to the other access agents if the current access agent has a higher rank; and means for sending a merge message to the other access agents if the current access agent has a lower rank.

22. The apparatus of claim 17 wherein said network-to-network interface is a LAN/WAN interface and said means for negotiating comprises:

first means for testing whether or not a group leader message has been received from another access agent in a predetermined interval of time, said group leader message identifies the WAN attached to said another access agent;

second means responsive to a group leader message for testing whether the group leader message comes from an access agent attached to the same WAN as the current access agent; and means responsive to said second testing means for sending a negotiate message to the other access agents if the group leader message does not come from an access agent attached to the same WAN as the current access agent.

23. The apparatus of claim 22 wherein said negotiate message identifies the WAN attached to the access agent sending the negotiate message and said means for resolving comprises:

third means for testing whether the negotiate message from another access agent indicates the other access agent has a higher rank than the current access agent;

fourth means for testing whether the negotiate message comes from another access agent attached to the same WAN as the current access agent;

means responsive to said third and fourth testing means for sending a group leader message to the other access agents if the current access agent has a higher rank and is on the same WAN; and means responsive to said third and fourth testing means for sending a merge message to the other access agents if the current access agent has a lower rank and is on the same WAN.

* * * * *